No. 706,941. Patented Aug. 12, 1902.
J. J. HILDEBRANDT.
TROLLING BAIT.
(Application filed Nov. 21, 1901.)
(No Model.)
Fig. 1.
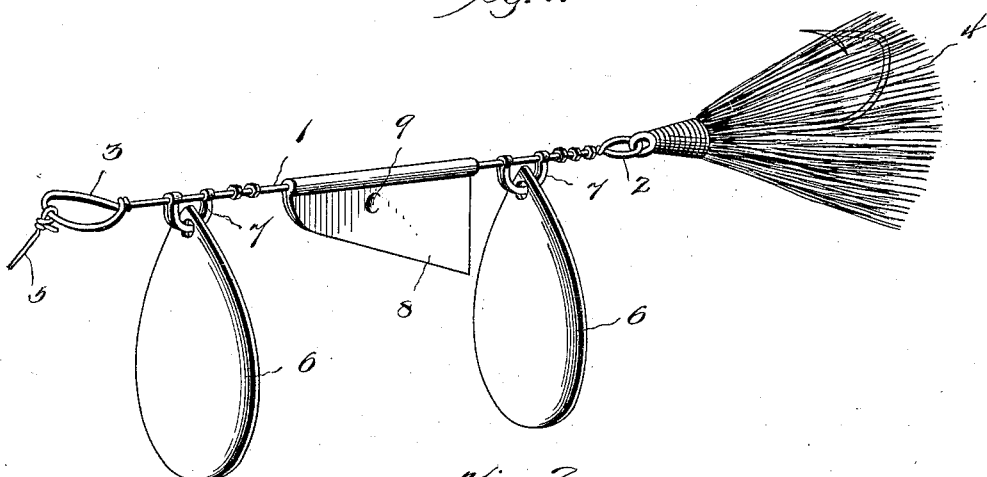
Fig. 2.
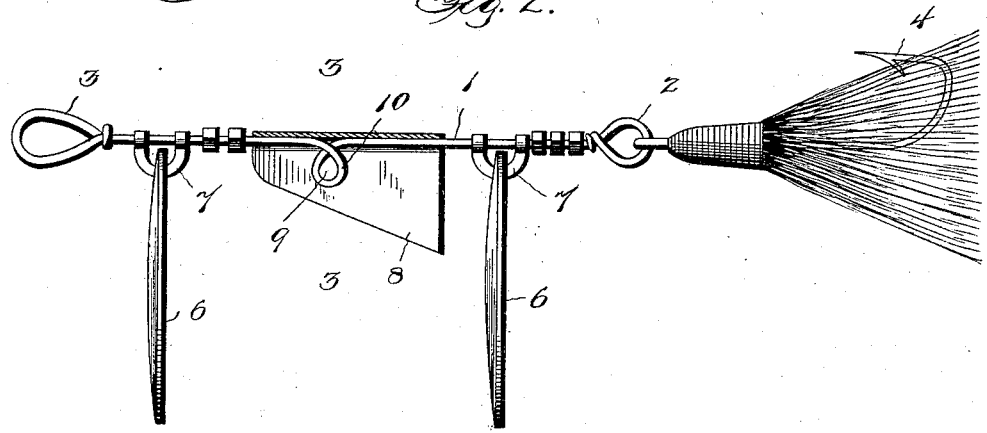
Fig. 4.
Fig. 3.
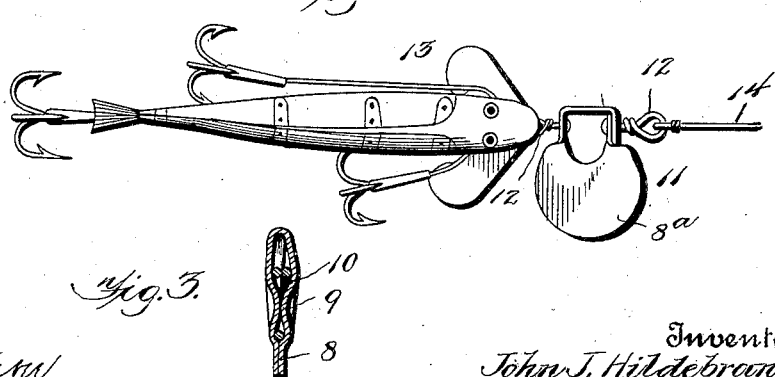
Witnesses
Inventor
John J. Hildebrandt,
by
Attorneys

UNITED STATES PATENT OFFICE.

JOHN J. HILDEBRANDT, OF LOGANSPORT, INDIANA.

TROLLING-BAIT.

SPECIFICATION forming part of Letters Patent No. 706,941, dated August 12, 1902.

Application filed November 21, 1901. Serial No. 83,115. (No model.)

*To all whom it may concern:*

Be it known that I, JOHN J. HILDEBRANDT, a citizen of the United States, residing at Logansport, in the county of Cass and State of Indiana, have invented certain new and useful Improvements in Trolling-Bait, of which the following is a specification.

This invention relates to fishing-tackle, and has special reference to artificial bait of the type generally known in the art as "trolling baits or spoons."

To this end the invention primarily contemplates an improvement in trolling-baits, which is intended to render the same much more effective, besides obviating the objections to the ordinary trolling or spoon baits usually made up of jointed sections or members and so constructed as to cause a constant twisting of the line during the trolling operation.

The invention therefore has in view an auxiliary attachment for trolling or spoon baits which dispenses with many of the joints and connections usually resorted to in the formation of baits of this character, while at the same time providing what might be properly termed a "keel" for the bait, so that as the same travels through the water the bait-stem or spoon-section, to which the line is attached, will be held from turning, and consequently will prevent the twisting of the line.

The invention also contemplates in this connection a keel attachment which not only obviates twisting the line, but serves to stiffen the bait-stem, so that the bait may be cast with less possibility of tangling the line. Also the keel attachment is designed to serve the useful function of a divider for the pair of spoons to maintain the same in proper separation.

With these and many other objects in view, which will more readily appear to those familiar with the art as the nature of the invention is better understood, the same consists in the novel construction, combination, and arrangement of parts hereinafter more fully described, illustrated, and claimed.

While the invention is necessarily susceptible to embodiment in different modifications without departing from the spirit or scope thereof, still a preferred embodiment is shown in the accompanying drawings, in which—

Figure 1 is a perspective view of a trolling-bait embodying the improvement contemplated by the present invention. Fig. 2 is a side view showing the keel-piece partly in section to expose the offset on the bait-stem. Fig. 3 is a cross-sectional view on the line 3 3 of Fig. 2. Fig. 4 is a detail elevation of a modification of the invention, showing its adaptability to another type of bait, such as commonly known as a "phantom minnow."

Like numerals of reference designate corresponding parts in the several figures of the drawings.

In carrying out the invention the same must necessarily be utilized in slightly-different ways, according to the particular character or formation of the trolling-bait with which it is employed. However, by referring to the views of the drawings the purpose and utility of the invention will be fully understood.

In adapting the improvement to the trolling-spoon bait an important advantage is secured by employing in connection with the attachment a bait stem or shaft 1, consisting of a single length of wire which is non-jointed. This is in contradistinction to the ordinary spoon-bait, in which the bait stem or shaft, which carries the spoons as well as the hook, is made up of a plurality of sections loosely jointed together and which very frequently cause a tangling of the line in the casting operation. Consequently all loose joints and connections are obviated in applying the invention to a trolling-spoon bait, and the single-length bait stem or shaft is provided at its opposite extremites with the attaching eyes 2 and 3, to which are connected, respectively, the hook 4 and the line 5, the said bait stem or shaft 1 also sustaining the spoons 6. There is usually a pair of these spoons employed, and the same are of the ordinary form used in trolling-baits, besides having loose connections at one end, as at 7, with the bait stem or shaft, whereby the same may freely swing or revolve upon the stem or shaft in the trolling operation. In the usual forms of trolling-baits the proper separation between the spoons is effected by the jointed construction of the bait-stem; but in the present invention it is maintained through the medium of the interposed keel-piece 8, which constitutes an essential feature of the invention. This keel-piece may be of any practical form and may necessarily be constructed in a variety of ways, it only being necessary that the same be rigidly fastened to the bait-stem and projecting a material distance at one side thereof to act in the capacity of a keel to steady the tackle as it travels through the water and to positively prevent a turning of the bait-stem.

In the preferable construction shown the keel-piece 8 is of a sector-like form and consists of a plate of flat metal folded over the bait-stem 1 and fastened together by the clenching-tongue 9 or equivalent expedient. In this construction the bait-stem is preferably looped at a point between its ends to form a lateral offset 10, over which the keel-piece is folded in order to prevent a turning of the bait-stem within the keel-piece. This expedient is a practical one for the reason that a small-sized wire is usually employed in constructing trolling-baits, the wire being of such a size as not to stand solder or equivalent fastening means. Of course where heavier wire is employed any fastening means may be resorted to for securing the keel-piece fast to the bait-stem. In the light-wire construction it is also obvious that the keel-piece materially stiffens the stem. Besides the said keel-piece, in addition to preventing the stem from turning and dispensing with the usual swivel on ordinary trolling-baits, fills up the interval between the spoons and gives a more life-like appearance to the bait as it is trolled through the water.

The keel-piece may, as stated, be utilized in a variety of ways and in connection with different kinds of bait. For instance, in the type of bait shown in Fig. 4 of the drawings, and which is commonly known as the "phantom-minnow," bait the usual swivel of this bait is dispensed with and in place thereof is substituted a keel-section 11, consisting of a keel plate or piece 8ª, provided with oppositely-extending attaching-eyes 12, to which are respectively connected the bait proper, 13, and the line 14.

From the foregoing it is thought that the construction and many advantages of the herein-described improvement will be readily apparent, and it will be understood that various changes in the form, proportion, and minor details of construction may be resorted to without departing from the spirit or sacrificing any of the advantages of the invention.

Having thus described my invention, what I claim as new, and desire to secure by Letters Patent, is—

1. A device of the class described having a stem carrying the artificial bait, and a flat metallic plate having a direct connection with said stem and projecting solely from one side thereof to constitute a keel.

2. In a trolling-bait, the bait-stem having a looped offset, and a keel-piece consisting of a flat plate doubled over said stem and clenched into the looped offset thereof, said keel-piece having a projection solely at one side of the stem to constitute a keel for the bait.

3. A trolling-bait having a bait-stem carrying the spoons and the hook, and a keel-piece rigid with the stem and interposed between the spoons.

4. A trolling-bait having a single-length bait-stem carrying the hook, and a pair of spoons loose thereon, and a plate having a non-rotative connection with the stem between the spoons and projecting at one side of the stem to operate as a keel to prevent turning of the stem.

In testimony whereof I affix my signature in presence of two witnesses.

JOHN J. HILDEBRANDT.

Witnesses:
 WM. STRAHLE,
 AL SCHMIDTS.